US005425169A

United States Patent [19]

Steinman et al.

[11] Patent Number: 5,425,169

[45] Date of Patent: Jun. 20, 1995

[54] BACKPLANE REMOVAL AND INSERTION TOOL

[75] Inventors: Joseph R. Steinman; Richard A. Lyon, both of Austin, Tex.; Michael A. Viselli, Middletown; Robert S. Correll, Jr., Harrisburg, both of Pa.

[73] Assignee: The Whitaker Corporation, Wilmington, Del.

[21] Appl. No.: 161,300

[22] Filed: Dec. 2, 1993

[51] Int. Cl.[6] .................... B23P 19/04

[52] U.S. Cl. .................... 29/758; 29/267; 29/764

[58] Field of Search .................... 29/267, 278, 747, 750, 29/751, 752, 758, 764, 741; 254/131; 439/152, 153, 157

[56] References Cited

U.S. PATENT DOCUMENTS

| | | | |
|---|---|---|---|
| 2,409,289 | 10/1946 | Levin et al. | 439/152 |
| 2,513,821 | 7/1950 | Schneider | 254/131 |
| 3,059,206 | 10/1962 | Williams | 439/157 |
| 3,180,670 | 4/1965 | Pryde | 439/153 X |
| 3,516,142 | 6/1970 | DeRose et al. | 29/758 X |
| 3,859,706 | 1/1975 | Williams et al. | 29/267 X |
| 4,152,827 | 5/1979 | Walton, II | 29/764 |
| 4,223,934 | 9/1980 | Cauceglia et al. | 29/764 X |
| 4,507,861 | 4/1985 | Sprenkle | 29/741 |
| 4,583,287 | 4/1986 | McDevitt et al. | 29/758 X |
| 5,062,201 | 11/1991 | Long, Jr. | 29/764 X |
| 5,077,722 | 12/1991 | Geist et al. | 439/157 X |
| 5,152,052 | 10/1992 | Rantala et al. | 29/278 X |

FOREIGN PATENT DOCUMENTS

| | | | |
|---|---|---|---|
| 2055322 | 3/1981 | United Kingdom | 29/764 |
| 1293008 | 2/1987 | U.S.S.R. | 29/267 |

OTHER PUBLICATIONS

"Universal Module Insertion Tool", IBM Technical Disclosure Bulletin, vol. 21, No. 5, Oct. 1978, pp. 1823–1824.

*Primary Examiner*—Peter Vo
*Attorney, Agent, or Firm*—Robert J. Kapalka

[57] ABSTRACT

A tool for removal and insertion of a backplane or other electrical member with respect to a housing comprises a frame which can be fixed with respect to the housing and a carriage which can be connected to the electrical member. The carriage is guided in floating relation with respect to the frame and is movable in a first direction to remove the electrical member and in a second direction to insert the electrical member. Fixing the frame with respect to the housing prevents movement of the frame away from the housing, thereby enabling application of force to the carriage sufficient to overcome resistance to insertion of the electrical member.

15 Claims, 8 Drawing Sheets

BACKPLANE REMOVAL AND INSERTION TOOL

FIELD OF THE INVENTION

The invention relates to a tool which is operable to generate a force in either of two opposite directions to both separate and connect mating electrical components, in particular to both remove and insert a backplane with respect to a card cage.

BACKGROUND OF THE INVENTION

Electronic components generally have electrical terminals which join with mating terminals of associated components. Mating pairs of terminals may be of the type wherein one terminal is frictionally engaged in the other terminal. Each mating pair of frictionally engaging terminals exhibits a resistance to connection or disconnection, and a force must be applied to overcome the resistance. For electronic components having numerous terminals, the sum of the forces for all of the mating pairs may be quite large, thereby necessitating that a relatively large force be applied to connect or disconnect the components. In some cases it is quite difficult to apply such force due to the components being somewhat fragile and being packaged closely together, thereby making hand access difficult.

Various tools are known for separating electronic components which are in mating engagement. See, for example, U.S. Pat. Nos. 2,409,289 to Levin et al., 2,513,821 to Schneider, and 3,516,142 to DeRose et al. Each of these patents discloses a pulling tool comprising a pair of cooperating frame members one of which rests on a base or socket for an electronic component, and the other of which engages the electronic component to be removed therefrom. A camming member is operable to draw the one frame member toward the other, thereby disengaging the electronic component from its respective base or socket. However, none of these tools is operable to exert a force for reinserting the electronic component to its base or socket.

U.S. Pat. No. 3,059,206 to Williams discloses a tool which is specially adapted for connecting and disconnecting mating plug and receptacle connectors. The tool has a pivotable handle and cam arrangement connected to move a pair of clamp members relatively together or apart upon pivoting of the handle. Each clamp member is attached to a respective plug or receptacle on opposite sides of a connector junction. The plug and receptacle are connected by moving the clamp members relatively together, and are disconnected by moving the clamp members relatively apart. In this regard, the tool of Williams operates contrary to the other tools discussed above wherein the frames are moved relatively together to disconnect mating components. The tool of Williams spans a connector junction and is not operable from one side of a connector junction to both join and disjoin mating connectors, as is necessary to both remove and insert a backplane from outside of a card cage type enclosure, for example.

There is a need for a simple tool which enables both connection and disconnection of mating electrical components. There is also a need for a tool which is operable to both couple and decouple mating electrical components from one side of an electrical connector junction. Such a tool would be particularly useful for coupling and decoupling a backplane from multiple mating connectors in a card cage enclosure. In order to remove a backplane from a card cage heretofore, it has been necessary to electrically disable the entire system and remove from the card cage all daughter boards which were connected to the backplane. There is a need for a tool which enables removal of a backplane while associated daughter boards remain in the card cage. The present invention provides a tool having these and other advantages.

SUMMARY OF THE INVENTION

A tool for coupling and decoupling a backplane or other electrical member with at least one mating member fixed with respect to a housing comprises a frame, means for securing the frame to the housing, a carriage, means for securing the carriage to the electrical member, means for guiding the carriage in floating relation with respect to the frame, and means for moving the carriage along the means for guiding in a first direction to remove the electrical member and in a second direction to insert the electrical member. The means for securing the frame prevents movement of the frame away from the housing, thereby enabling application of force by the means for moving sufficient to overcome resistance to coupling of the electrical member with the mating member.

In one embodiment, the frame comprises a substantially U-shaped member having an open end defined by a pair of feet mountable on the housing, and the carriage comprises a substantially U-shaped member disposed interiorly of the frame. The means for moving comprises a cam actuator assembly coupled between the frame and the carriage. The cam actuator assembly includes a pivotable cam member which defines an eccentric cam slot, and a cam follower is disposed in the slot. Sides of the slot define inner and outer cam surfaces which act to move the cam follower in one direction or the other during pivoting of the cam member.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION OF THE PREFERRED EMBODIMENT

Figure 1:
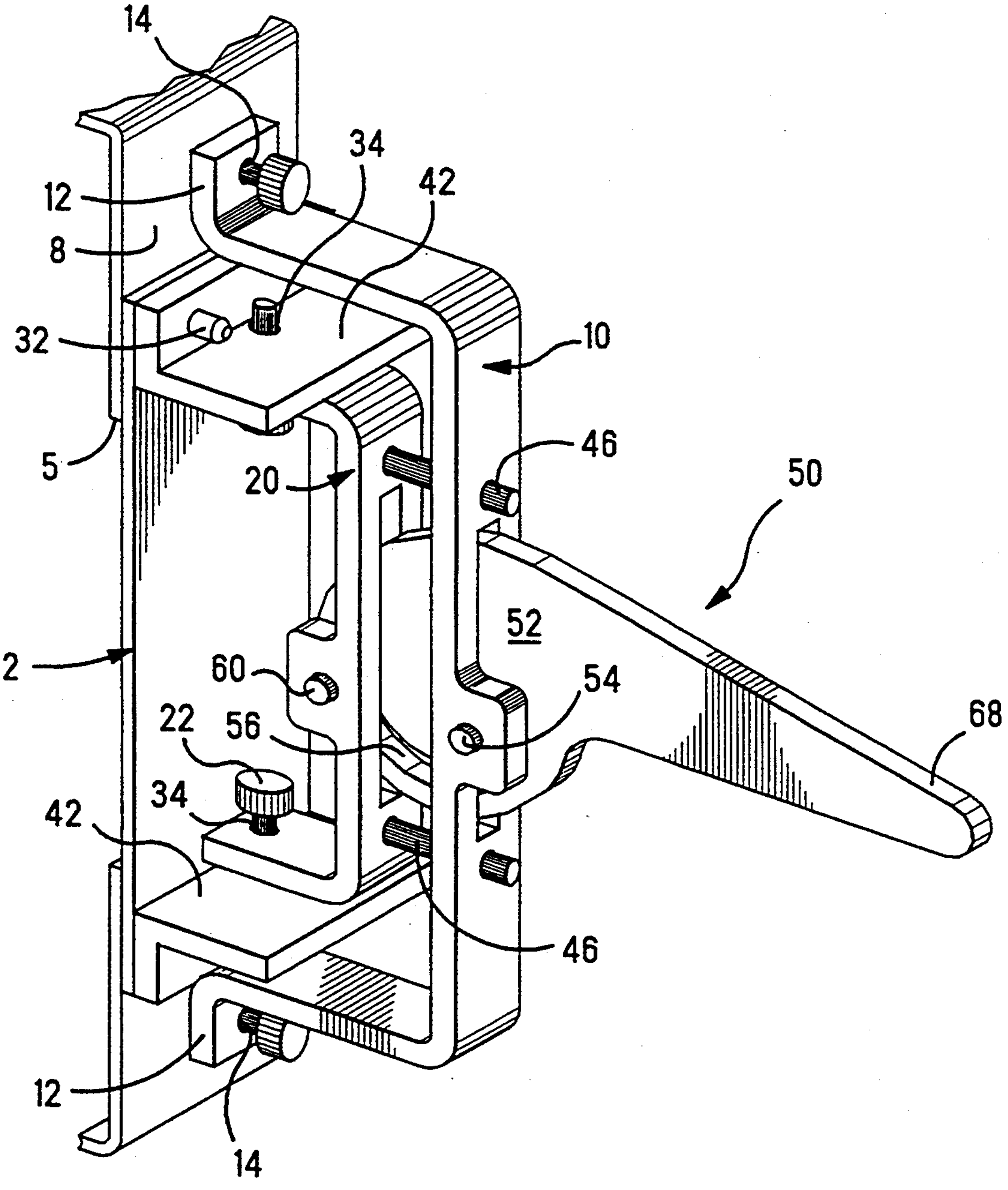
FIG. 1 is a perspective view of a single actuator removal and insertion tool which is disposed for removing a backplane from a card cage according to the invention.
Figure 2:
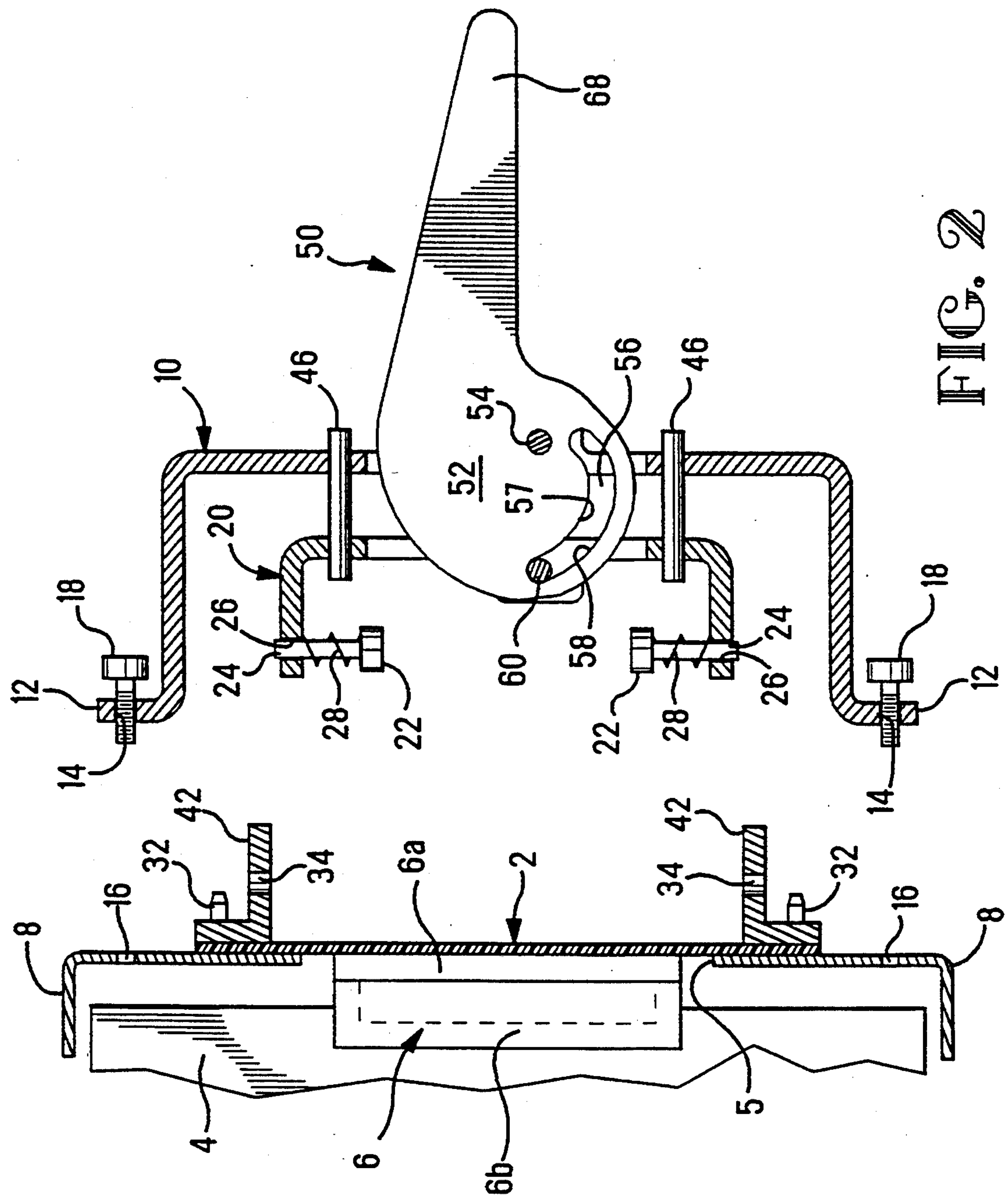
FIG. 2 is a side cross-sectional view of the removal and insertion tool, and a backplane connected to a daughter board in a card cage.

A tool according to the invention as shown in FIGS. 1 and 2 is specially adapted to remove and insert a backplane 2 with respect to a card cage or other housing 8. The card cage 8 provides an enclosure for electronic components and associated daughter boards, and the backplane 2 carries circuit paths which enable electrical interconnection of the daughter boards. The backplane 2 spans an opening 5 of the card cage 8 through which the backplane 2 makes electrical connection with the daughter boards in the card cage. The electrical connection or junction of the backplane 2 with the daughter boards defines an imaginary plane extending parallel to the backplane 2. An important aspect of the present invention is that the tool mounts on one side of the plane and is operable to exert a force in either of two opposite directions transverse to the plane.

In FIG. 2 a representative daughter board 4 is shown connected to the backplane 2 by a representative connector 6 which may be, for example, a card edge connector, a pin and socket connector or other wiping connector. Typically, a number of other daughter boards extending parallel to the daughter card 4 are similarly connected to the backplane 2. The connector 6 includes a backplane header **6*a* which is attached to the backplane 2, and a daughter board receptacle 6*b* which is attached to the daughter board 4. The backplane header 6*a* has numerous terminals which receive contacts of the daughter board receptacle 6*b* therein. Each of the terminals exerts a frictional force on its respective contact, the sum of the frictional forces being sufficiently large to maintain the backplane 2 in connection with the daughter board 4. In order to remove or insert the backplane 2 with respect to the card cage 8, the total frictional force must be exceeded by application of an outside force which is sufficient to couple or decouple the backplane 2** with or from its associated daughter boards.

The card cage 8 and the backplane 2 are specially adapted for use with the tool of the present invention. In one embodiment as shown in FIGS. 1 and 2, holes 16 are provided in the card cage 8 at the time of manufacture at locations selected to avoid interference with components in the card cage when the tool of the present invention is being used. Angle members 42 having apertures 34 are attached to the backplane 2 to provide a structure which can be more easily gripped by the removal and insertion tool. Optional guide posts 32 which extend from the card cage 8 are receivable in complementary holes in the backplane 2 and angle members 42 and serve to correctly align the backplane over the opening 5 of the card cage.

A tool according to the invention comprises a frame 10 and a carriage 20 each preferably having a generally U-shape with the carriage 20 being disposed interiorly of the frame 10. The tool includes a means for securing the frame 10 to the card cage 8, and a means for securing the carriage 20 to the backplane 2 or other electrical member.

In the embodiment shown in the FIGS. 1 and 2, legs of the U-shaped frame 10 are bent outwardly to define feet 12 mountable on the card cage 8. Holes 14 in the feet 12 are alignable with the holes 16 defined by the card cage 8. A means for securing the frame 10 to the card cage 8 comprises fasteners 18 which are engageable in the holes 16 such as by mating threaded engagement. The fasteners 18 are preferably held loosely captive in the holes 14 so as to retain the fasteners 18 to the frame 10 when the tool is unattached to the card cage 8, although the fasteners 18 may be threadedly engaged in the holes 14 for the same purpose. Alternate means for securing the frame 10 to the card cage 8 could be quarter-turn fasteners or cooperating slots and tabs.

Figure 3:
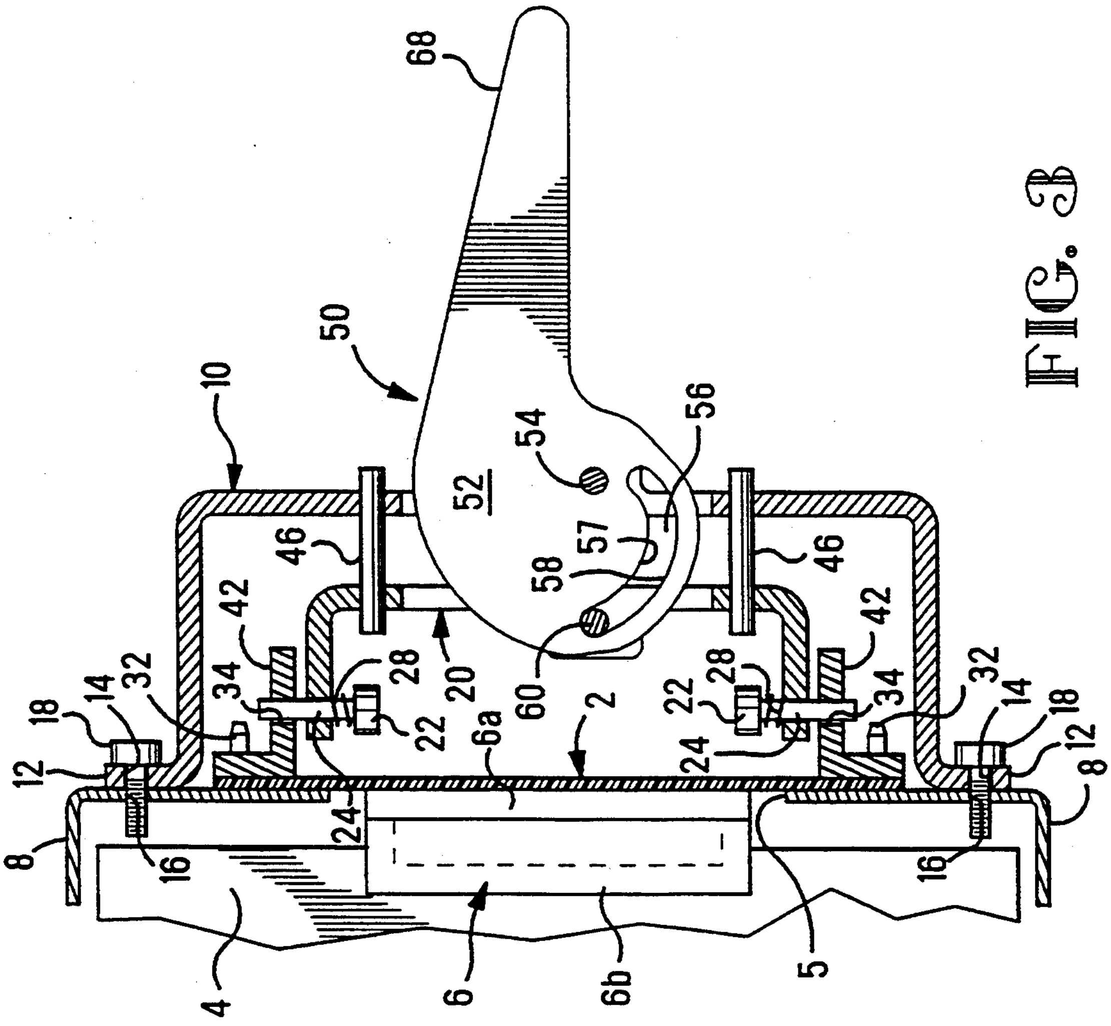
FIG. 3 is a side cross-sectional view of the tool attached to the card cage for removal of the backplane therefrom.

A means for securing the carriage 20 to the backplane 2 comprises oppositely oriented plungers 24 which are engageable in the apertures 34. The plungers 24 reside in holes 26 defined by legs of the U-shaped carriage 20. The plungers 24 are captively held and biased by springs 28 such that the plungers 24 are urged exteriorly of the U-shaped carriage 20. The springs 28 are shown in FIG. 2 but are omitted from FIG. 1 for clarity. Finger grips 22 enable the plungers 24 to be retracted from their normal position against the bias of the springs 28 so that the legs of the carriage 20 can be inserted between the angle members 42, as shown in FIG. 2, whereupon the plungers 24 are releasable for engagement in the apertures 34, as shown in FIG. 3.

Guide beams 46 provide a means for guiding the carriage 20 in floating relation with respect to the frame 10. The guide beams 46 may be fixedly attached to, for example, the frame 10, and the carriage 20 may have complementary holes which receive the pins 46 with a slip fit so that the carriage 20 is slidable thereon. Alternatively, the guide beams 46 may be fixedly attached to the carriage 20 and be slidable in holes defined by the frame 10, or the frame and carriage may both be slidable on pins which are prevented from being withdrawn from the frame and carriage such as by spring clips.

The tool includes a means for moving the carriage along the means for guiding in a first direction to remove the backplane 2 with respect to the card cage 8, and in a second direction to insert the backplane with respect to the card cage. The means for moving may include a cam actuator assembly shown generally as 50 coupled between the frame 10 and the carriage 20. The cam actuator 50 includes a cam member 52 which is pivotable on pin 54 attached to the frame 10. The cam member 52 has an eccentric cam slot 56 defined by inner and outer cam surfaces 57, 58, respectively. A cam follower 60 which extends from the carriage 20 rides in the cam slot 56. The cam member 52 includes an elongated lever arm 68 which enables a tool operator to pivot the cam member 52 on the the pin 54. When the cam member 52 is pivoted, the cam follower 60 is urged by a respective one of the cam surfaces 57, 58 in one direction or the other to move the carriage 20 relatively toward or away from the frame 10.

Figure 4:
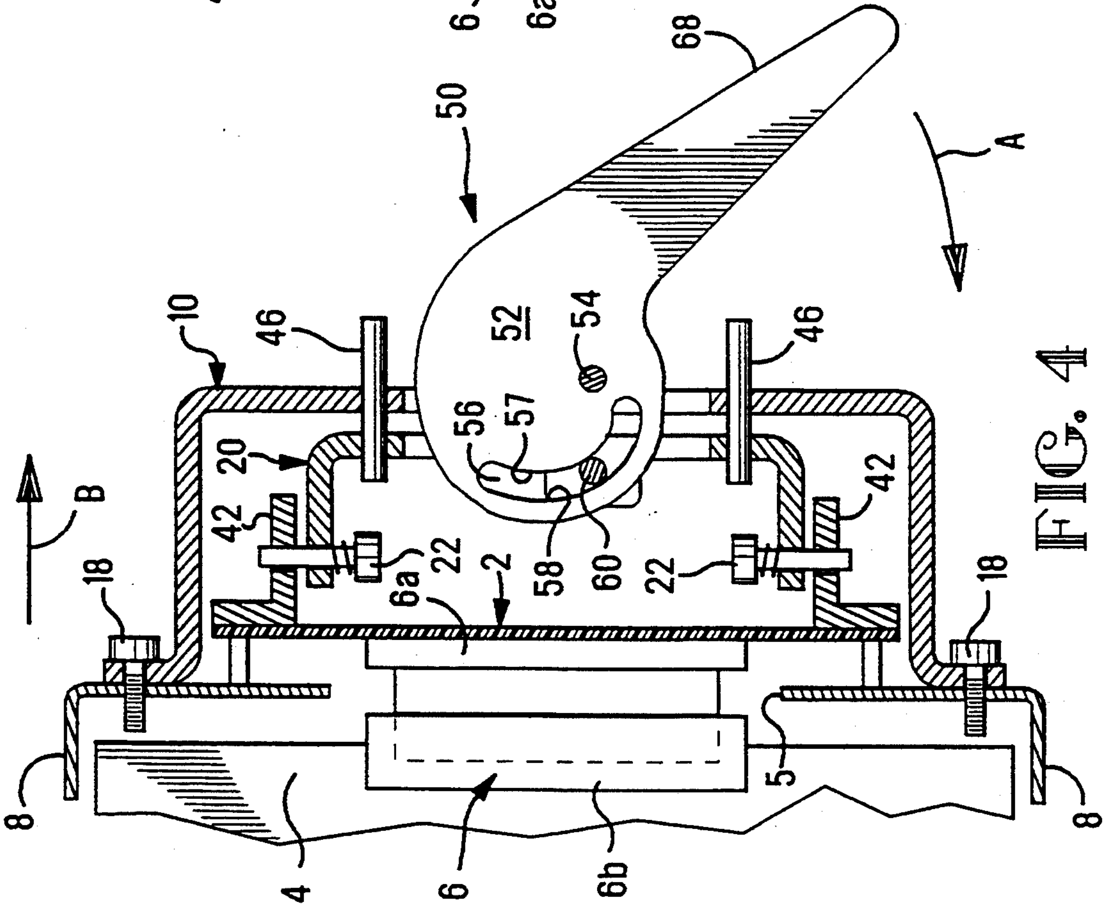
FIG. 4 is a side cross-sectional view of the tool during an intermediate stage of removing the backplane from the card cage.

Application of the tool to remove a backplane from a card cage will now be discussed. With reference to FIG. 3, with the plungers 24 retracted against the bias of the springs 28, the legs of the carriage 20 can be introduced between the angle members 42. The plungers 24 are then released to engage in their respective holes 26, and the fasteners 18 are engaged in the holes 16 to secure the tool to the card cage 8. The tool can now be used to remove the backplane 2. A tool operator urges the lever arm 68 downwardly to pivot the cam member 52 clockwise on the cam pin 54. FIG. 4 depicts an intermediate stage of tool operation. As the cam member 52 is pivoted in the direction of arrow A, the eccentric outer cam surface 58 draws the cam follower 60 toward the cam pin 54, thereby drawing the carriage 20 toward the fixed frame 10 and drawing the backplane 2 away from the card cage 8 in the direction of arrow B.

Figure 5:
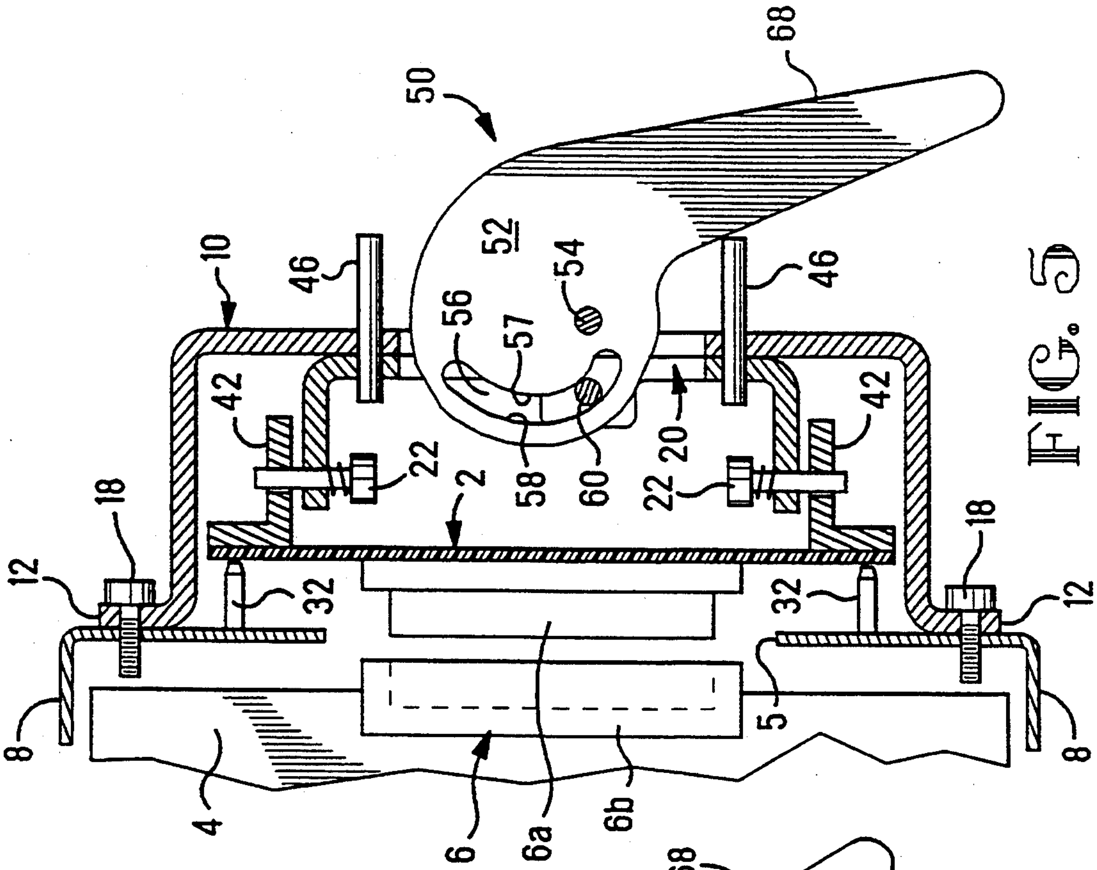
FIG. 5 is a side cross-sectional view of the tool having removed the backplane from the card cage.

FIG. 5 depicts complete withdrawal of the backplane 2 beyond ends of the guide posts 32 and complete separation of the backplane header *6a* from the daughter board receptacle *6b*. The fasteners 18 can then be disengaged from the card cage to permit complete removal of the backplane therefrom.

A replacement backplane 2 can be inserted on the card cage 8 by reversing the removal process. With a replacement backplane held on the tool by the plungers 24, the fasteners 18 are reengaged with the card cage 8. The lever arm 68 is lifted upwardly to pivot the cam member 52 counter-clockwise, whereby the inner cam surface 57 urges the cam follower 60 toward the card cage. As the backplane header *6a* engages the daughter board receptacle *6b*, resistance to insertion of the circuit board in the connector produces a reaction force at the cam pin 54 which tends to pull the frame 10 away from the card cage. The reaction force is resisted by the means for securing the frame to the housing such as the fasteners 18 which are engaged in the card cage, thereby enabling application of force by the cam actuator 50 sufficient to overcome resistance to insertion of the backplane with respect to the card cage.

Figure 6:
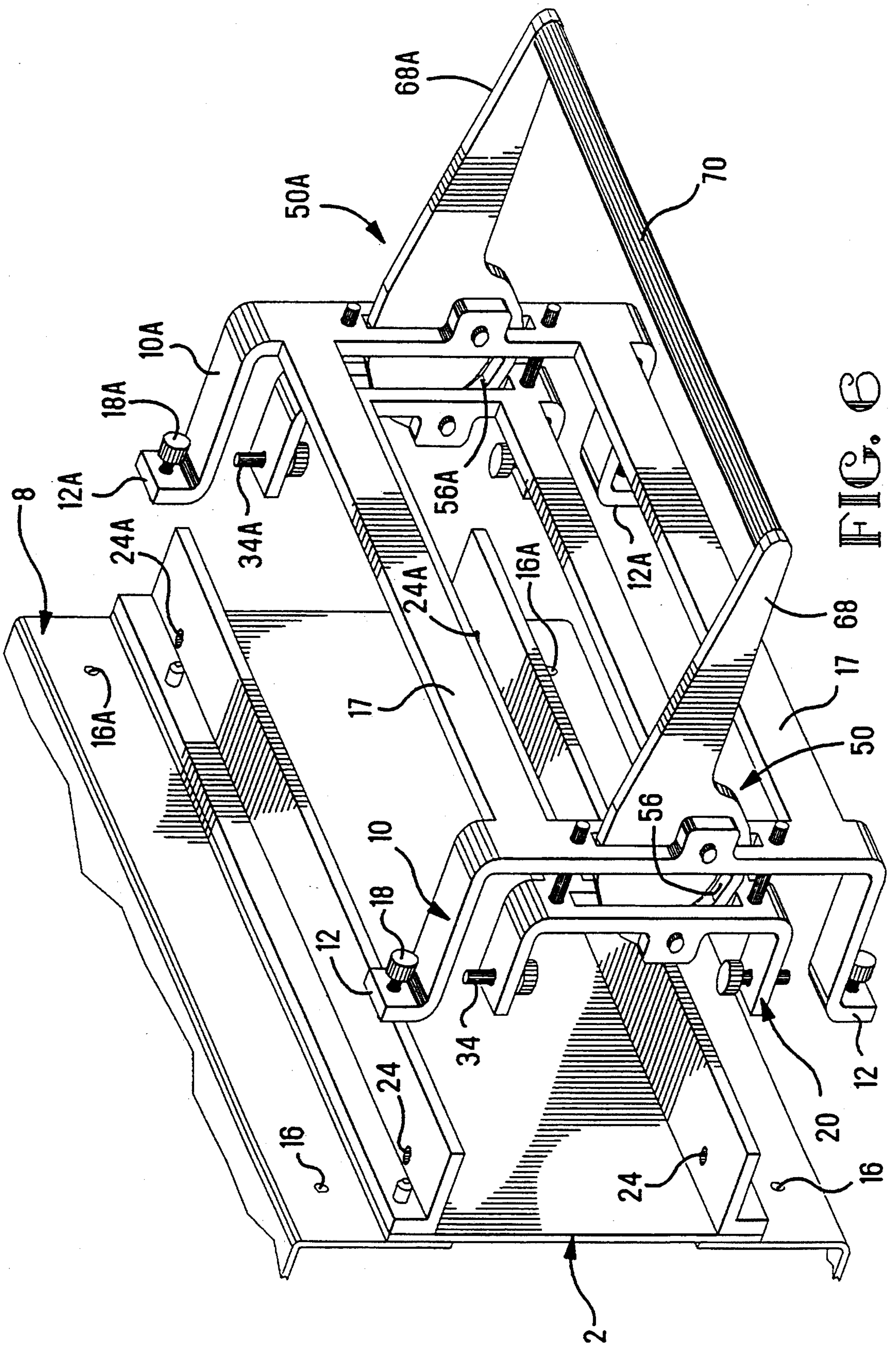
FIG. 6 is a perspective view of a dual actuator tool according to the invention.

FIG. 6 shows an embodiment of the tool wherein pairs of like tool elements are joined in side-by-side spaced apart relationship, for example, to operate on a backplane of extended length. In particular, the frame comprises a pair of substantially U-shaped frame members 10, 10A having respective open ends defined by respective pairs of feet 12, 12A mountable on the card cage 8. The U-shaped frame members 10, 10A are spaced apart and connected by at least one strut and preferably a pair of struts 17. Similarly, the carriage comprises a pair of substantially U-shaped carriage members 20, 20A disposed interiorly of the frame members 10, 10A. A means for moving the carriage comprises a pair of cam actuator assemblies 50, 50A each coupled between respective ones of the frame members 10, 10A and the carriage members 20, 20A. The cam actuators 50, 50A are joined by a bar 70 which extends between respective lever arms 68, 68A of the cam assemblies to enable simultaneous operation thereof.

Figure 7:
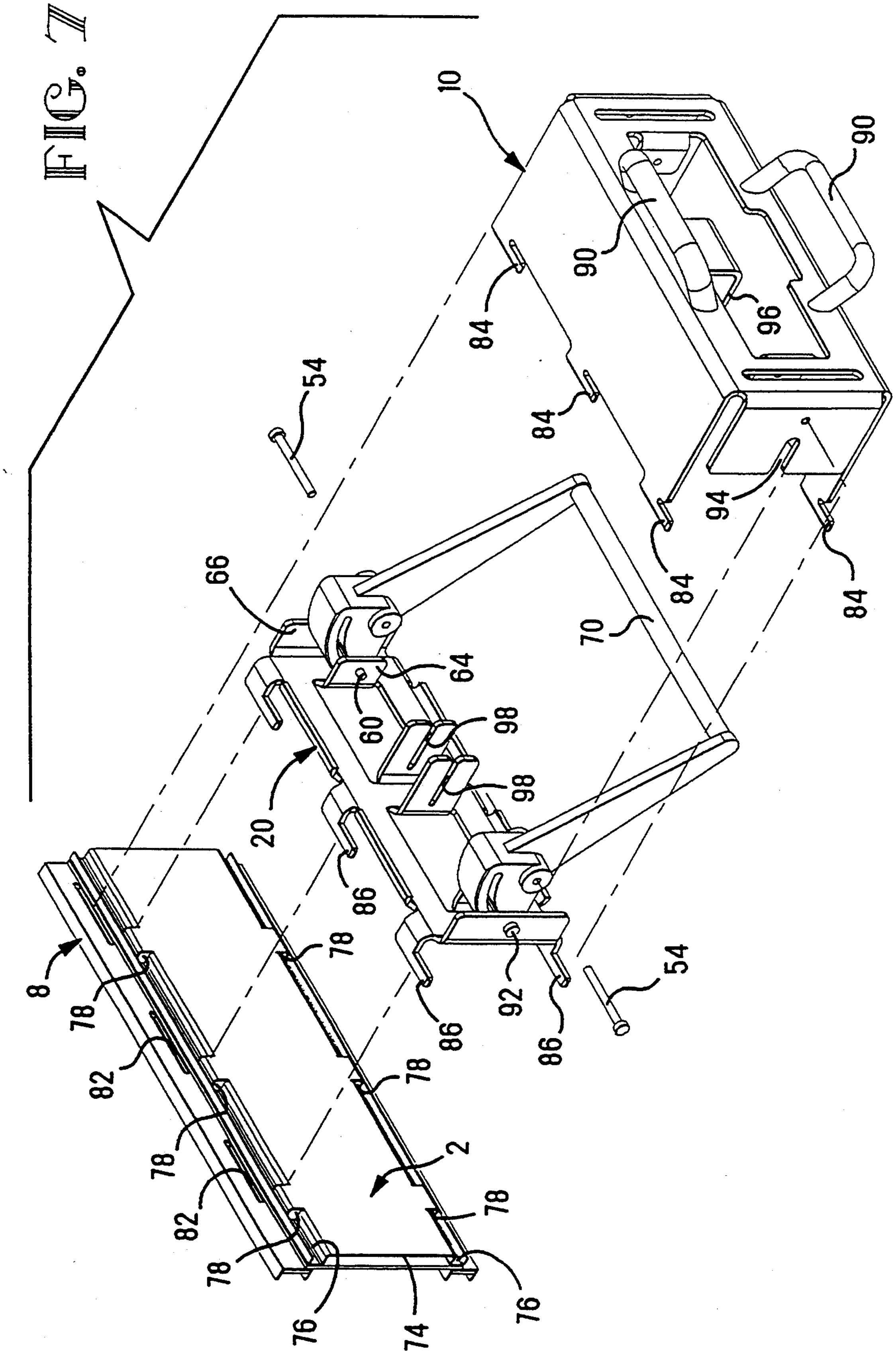
FIG. 7 is an exploded perspective view of an alternate embodiment of the tool according to the invention, and a backplane mounted on a card cage.
Figure 8:
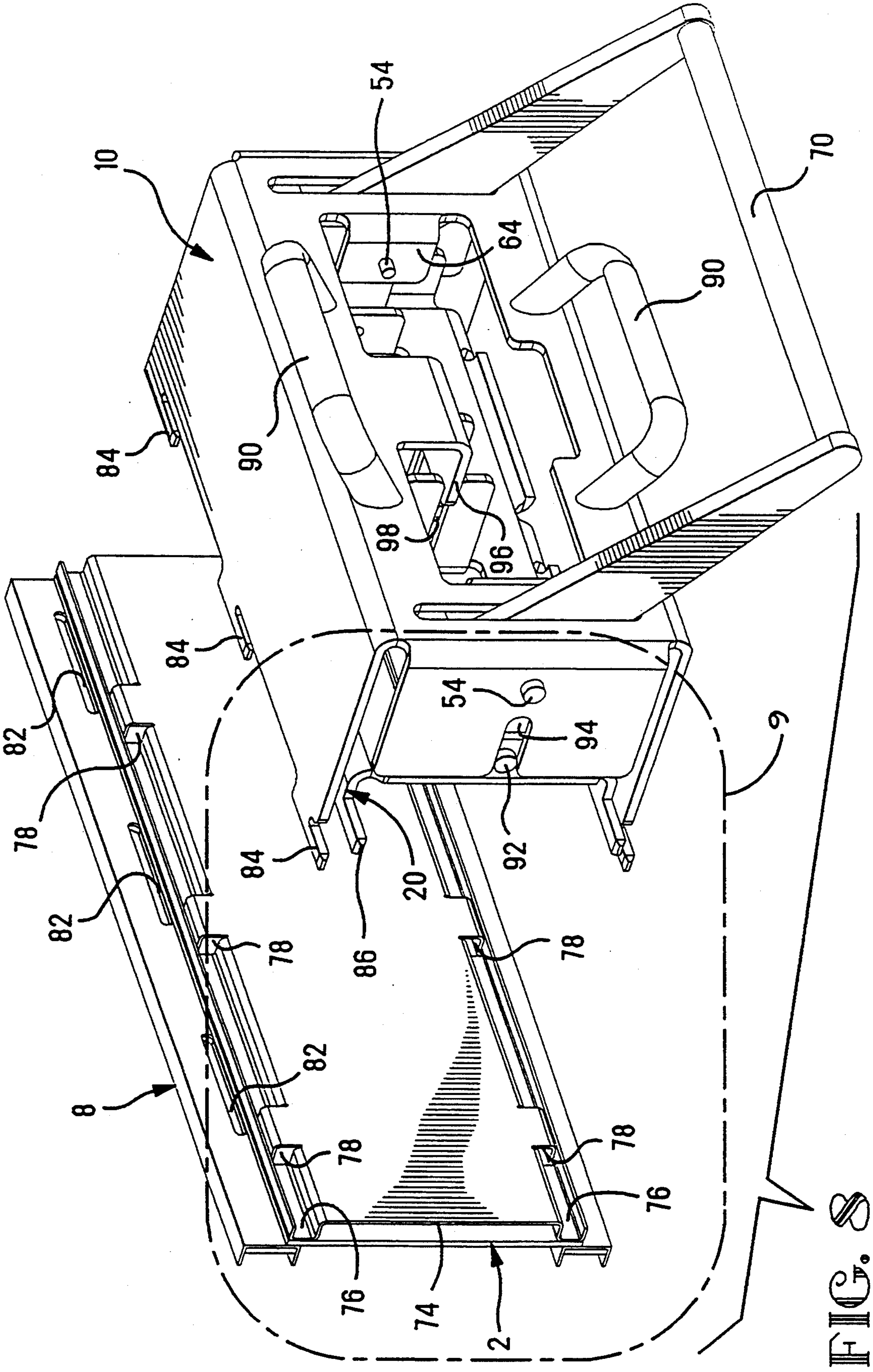
FIG. 8 is a perspective view of the tool shown in FIG. 7 in an assembled condition.
Figure 9:
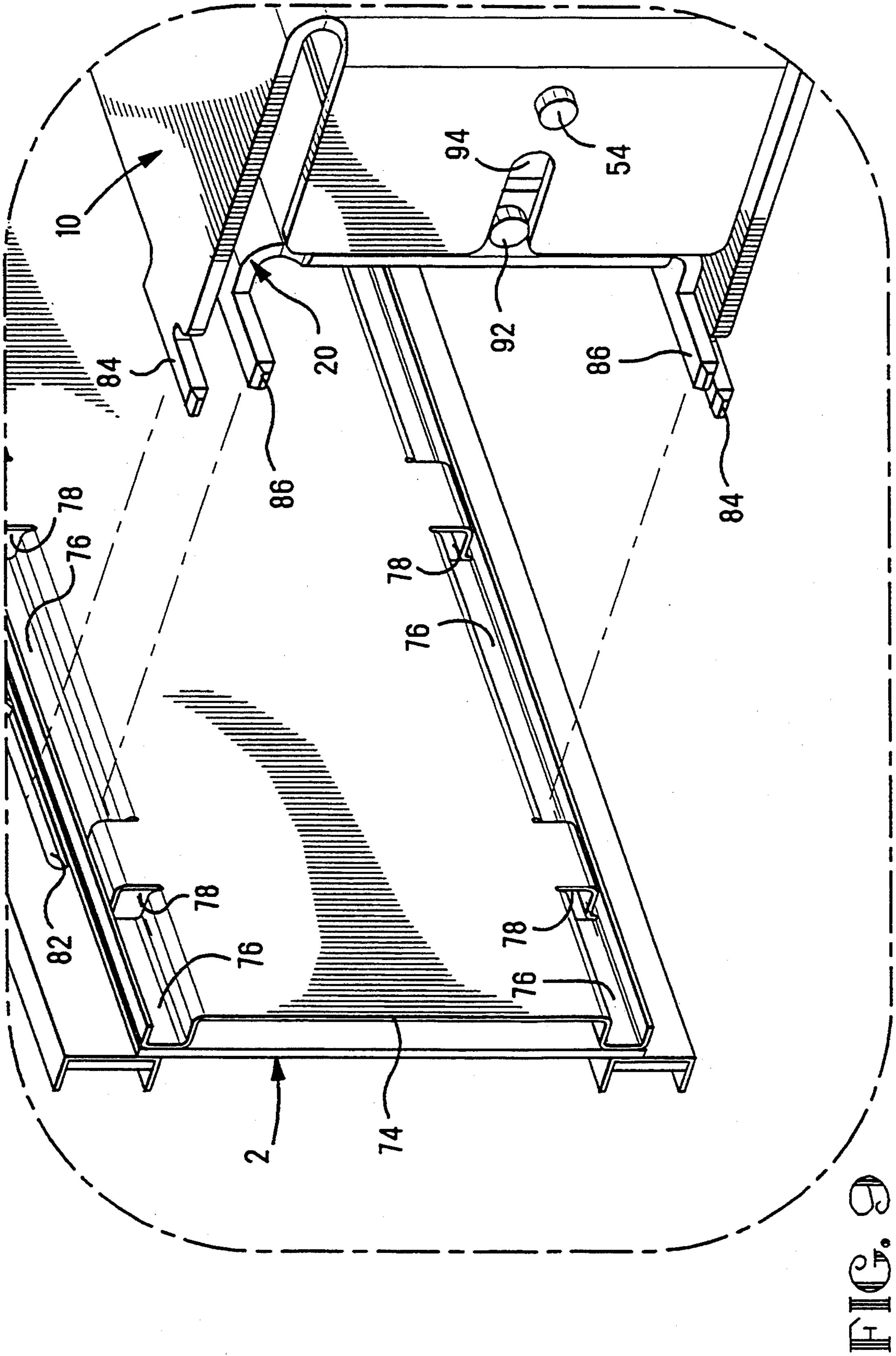
FIG. 9 is an enlarged detail of a delineated portion of FIG. 8.

An alternate embodiment of a tool according to the invention is shown in FIGS. 7–9 wherein elements like those of the previously discussed embodiments are referred to by the same reference numbers. As shown in the drawings, a cover 74 attached to the backplane 2 is formed from sheet material. Margins of the sheet are formed to provide channels 76 the bottoms of which seat on the backplane 2 and are attached thereto by any suitable means. Slices in a wall of each channel 76 enable sections along the walls to be formed into a plurality of tunnels 78 which may receive suitable hook members therein. The card cage 8 is provided with a plurality of apertures 82 which similarly may receive suitable hook members therethrough.

A means for securing the frame 10 to the card cage 8 comprises hooks 84 which are receivable through the apertures 82. A means for securing the carriage 20 to the backplane comprises hooks 86 which are receivable in the tunnels 78. When the hooks 84 are inserted through the apertures 82, the entire tool is slidable leftwardly for a short distance along the card cage 8. The hooks 84 will then coextend behind a wall of the card cage 8 adjacent to each of the apertures 82, the wall of the card cage thus defining a catch for each of the hooks 84 and preventing withdrawal of the tool away from the card cage. Simultaneous with sliding of the tool along the card cage, the hooks 86 of the carrier 20 are moved into the tunnels 78 which thereby provide a respective catch for each of the hooks 86 and secure the holder 20 to the backplane 2.

A means for guiding the carriage 20 in floating relation with respect to the frame 10 comprises the holder having a pair of brackets defining slots 98 which receive an extension tab 96 extending from the frame.

The holder 20 carries cam followers 60 each of which is supported near its ends by two brackets 64 and 66. Heads 92 of the cam followers 60 are received in slots 94 which serve as a secondary means for guiding the carriage 20 with respect to the frame 10.

Handles 90 are provided on the frame 20 to allow an operator to more easily grip and maneuver the tool.

A novel feature of the embodiment shown in FIGS. 7–9 is that the hooks 86 are somewhat longer than the hooks 84. When the tool is secured to the card cage 8, the hooks 84 coextend along wall portions of the card cage 8 adjacent to the apertures 82, and the hooks 86 coextend along walls of the tunnels 78. After the backplane 2 has been decoupled from its daughter boards by operation of the cam actuators 50 to draw the backplane 2 away from the card cage 8, the tool is movable through a first distance relative to the card cage 8 (to the right as shown in the drawings) whereby the hooks 84 become aligned with the apertures 82. During this maneuver, the hooks 86 are partially withdrawn from the tunnels 78, but end portions of the hooks 86 still remain within the tunnels. At this time, the tool having the backplane 2 secured thereto may be withdrawn from the card cage 8. The tool is then movable through a second further distance with respect to the card cage whereby the hooks 86 are withdrawn completely from the tunnels 78 and the backplane 2 is released from the tool.

The invention has the advantages of providing a simple tool which is operable to both remove and replace an electrical member with respect to a socket or seat for the electrical member, and in particular to both remove and insert a backplane With respect to a card cage. The tool mounts on one side of a plane defined by an electrical connector junction and is operable to exert a force in either of two opposite directions transverse to the plane. The tool enables a backplane to be decoupled from its daughter boards and removed from a card cage without removing any of the daughter boards from the card cage. The tool is also useful for removing a midplane from a card cage after the daughter boards on one side of the midplane have been removed.

The invention having been disclosed, a number of variations will now become apparent to those skilled in the art. Whereas the invention is intended to encompass the foregoing preferred embodiments as well as a reasonable range of equivalents, reference should be made to appended claims rather than the foregoing discussion of examples, in order to assess the scope of the invention in which exclusive rights are claimed.

We claim:

1. A tool for coupling and decoupling an electrical member with at least one mating member fixed with respect to a housing, the tool comprising:
- a frame and means for securing the frame to the housing;
- a carriage and means for securing the carriage to the electrical member;
- means for guiding the carriage in floating relation with respect to the frame; and, means for moving the carriage along the means for guiding in a first direction to decouple the electrical member and in a second direction to couple the electrical member, the means for moving including a cam actuator coupled between the frame and the carriage, the cam actuator including a cam follower disposed in an eccentric cam slot;

wherein the means for securing the frame prevents movement of the frame away from the housing, thereby enabling application of force by the means for moving sufficient to overcome resistance to coupling of the electrical member to the mating member.

2. The tool according to claim 1, wherein the cam actuator includes a cam member which is pivotally coupled to the frame and which defines the eccentric cam slot, and the cam follower is secured to the carriage.

3. The tool according to claim 1, wherein the frame comprises a substantially U-shaped member having an open end defined by a pair of feet mountable on the housing.

4. The tool according to claim 3, wherein the carriage comprises a substantially U-shaped member disposed interiorly of the U-shaped frame member.

5. The tool according to claim 4, wherein the means for guiding comprises at least one guide beam fixed with respect to one of the U-shaped members and extending through a complementary shaped aperture defined by the other of the U-shaped members.

6. The tool according to claim 1, further comprising at least one handle attached to the frame.

7. A tool for coupling and decoupling an electrical member with at least one mating member fixed with respect to a housing, the tool comprising:

a frame and means for securing the frame to the housing, wherein the means for securing the frame to the housing comprises the housing having hooks each cooperable with a respective catch on the housing;

a carriage and means for securing the carriage to the electrical member;

means for guiding the carriage in floating relation with respect to the frame; and, means for moving the carriage along the means for guiding in a first direction to decouple the electrical member and in a second direction to couple the electrical member;

wherein the means for securing the frame prevents movement of the frame away from the housing, thereby enabling application of force by the means for moving sufficient to overcome resistance to coupling of the electrical member to the mating member.

8. A tool for coupling and decoupling an electrical member with at least one mating member fixed with respect to a housing, the tool comprising:

a frame and means for securing the frame to the housing;

a carriage and means for securing the carriage to the electrical member, wherein the means for securing the carriage to the electrical member comprises the carriage having plungers which are engageable in apertures defined by structure coupled to the electrical member;

means for guiding the carriage in floating relation with respect to the frame; and, means for moving the carriage along the means for guiding in a first direction to decouple the electrical member and in a second direction to couple the electrical member;

wherein the means for securing the frame prevents movement of the frame away from the housing, thereby enabling application of force by the means for moving sufficient to overcome resistance to coupling of the electrical member to the mating member.

9. The tool according to claim 8, wherein the plungers are spring biased.

10. A tool for coupling and decoupling an electrical member with at least one mating member fixed with respect to a housing, the tool comprising:

a frame and means for securing the frame to the housing;

a carriage and means for securing the carriage to the electrical member, wherein the means for securing the carriage to the electrical member comprises the carriage having hooks each cooperable with a respective catch defined by structure coupled to the electrical member;

means for guiding the carriage in floating relation with respect to the frame; and, means for moving the carriage along the means for guiding in a first direction to decouple the electrical member and in a second direction to couple the electrical member;

wherein the means for securing the frame prevents movement of the frame away from the housing, thereby enabling application of force by the means for moving sufficient to overcome resistance to coupling of the electrical member to the mating member.

11. A tool for coupling and decoupling an electrical member with at least one mating member fixed with respect to a housing, the tool comprising:

a frame and means for securing the frame to the housing, wherein the means for securing the frame to the housing comprises a first hook cooperable with a first catch;

a carriage and means for securing the carriage to the electrical member, wherein the means for securing the carriage to the electrical member comprises a second hook cooperable with a second catch;

means for guiding the carriage in floating relation with respect to the frame; and, means for moving the carriage along the means for guiding in a first direction to decouple the electrical member and in a second direction to couple the electrical member;

wherein the means for securing the frame prevents movement of the frame away from the housing, thereby enabling application of force by the means for moving sufficient to overcome resistance to coupling of the electrical member to the mating member, and wherein when the frame is secured to the housing and the carriage is secured to the electrical member and the electrical member is decoupled from the at least one member, the tool is movable through a first distance relative to the housing and to the electrical member whereby the first hook becomes disengaged from the first catch to enable removal of the tool and the electrical member secured thereto away from the housing, and the tool is movable through a second further distance with respect to the electrical member whereby the second hook becomes disengaged from the second catch to enable removal of the electrical member from the tool.

12. A tool for coupling and decoupling an electrical member with at least one mating member fixed with respect to a housing, the tool comprising:

a frame and means for securing the frame to the housing, wherein the means for securing the frame to the housing comprises the frame having threaded fasteners which are cooperable with mating threaded elements attached to the housing;

a carriage and means for securing the carriage to the electrical member;

means for guiding the carriage in floating relation with respect to the frame; and, means for moving the carriage along the means for guiding in a first direction to decouple the electrical member and in a second direction to couple the electrical member;

wherein the means for securing the frame prevents movement of the frame away from the housing, thereby enabling application of force by the means for moving sufficient to overcome resistance to coupling of the electrical member to the mating member.

13. A tool for coupling and decoupling an electrical member with at least one mating member fixed with respect to a housing, the tool comprising:

a frame and means for securing the frame to the housing, wherein the frame comprises a pair of substantially U-shaped members having respective open ends defined by respective pairs of feet mountable on the housing, the U-shaped members being spaced apart and connected by at least one strut extending therebetween;

a carriage and means for securing the carriage to the electrical member;

means for guiding the carriage in floating relation with respect to the frame; and, means for moving the carriage along the means for guiding in a first direction to decouple the electrical member and in a second direction to couple the electrical member;

wherein the means for securing the frame prevents movement of the frame away from the housing, thereby enabling application of force by the means for moving sufficient to overcome resistance to coupling of the electrical member to the mating member.

14. The tool according to claim 13, wherein the means for moving comprises a pair of cam actuators each coupled between one of the U-shaped members and the carriage, the pair of cam actuators being joined by a bar for simultaneous operation.

15. The tool according to claim 14, wherein each of the cam actuators includes a cam follower disposed in an eccentric cam slot.

* * * * *